Dec. 24, 1968   A. L. HUBBARD   3,417,553
COTTON HARVESTER
Filed July 18, 1966
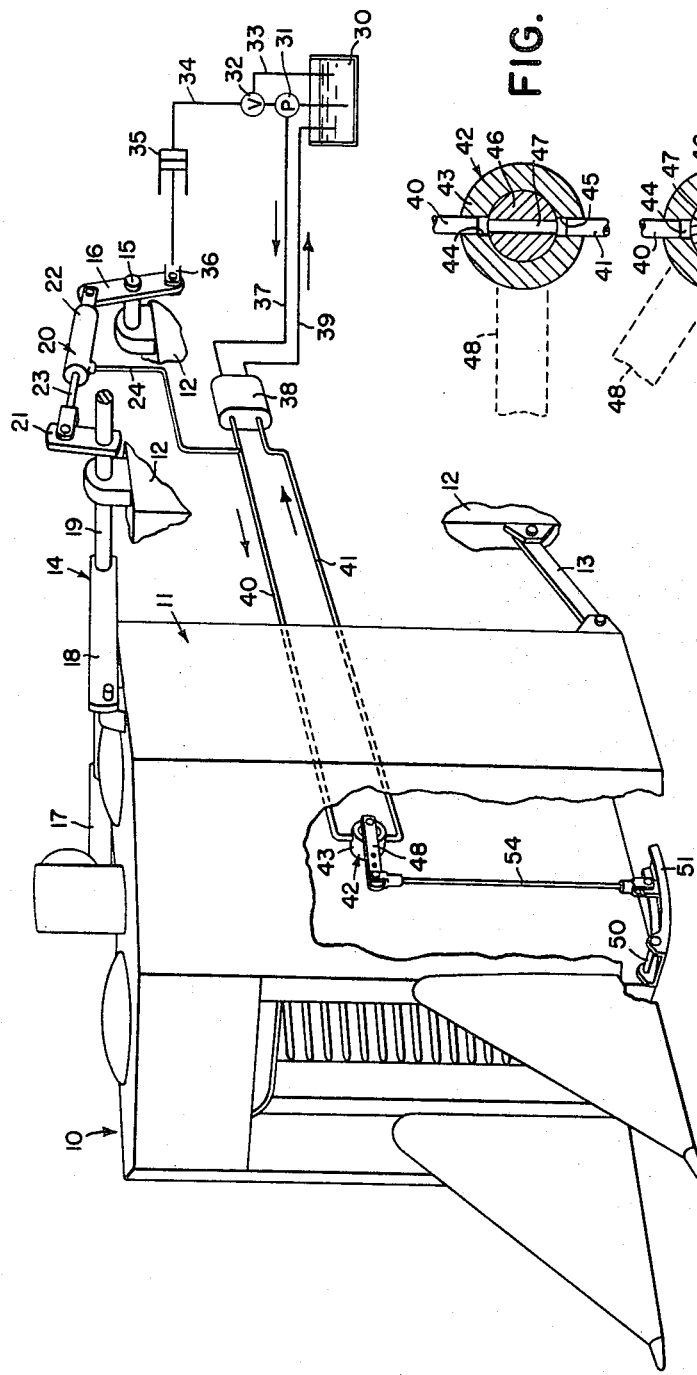
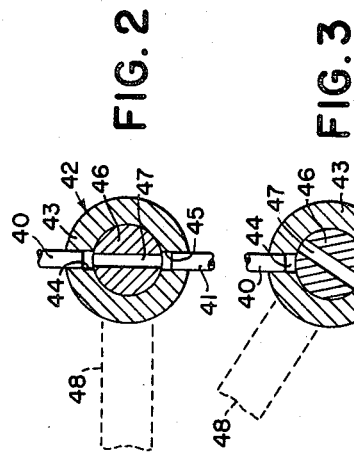
INVENTOR.
A. L. HUBBARD
BY William A. Murray
ATTORNEY United States Patent Office 3,417,553
Patented Dec. 24, 1968

3,417,553
COTTON HARVESTER
Arthur Lowell Hubbard, Des Moines, Iowa, assignor to Deere & Company, Moline, Ill., a corporation of Delaware
Filed July 18, 1966, Ser. No. 566,100
5 Claims. (Cl. 56—11)

This invention relates to a cotton harvester and more particularly to a leveling mechanism on the cotton harvester that maintains the harvester at a substantially equal distance above the surface of the ground.

It is conventional to mount a cotton harvester on a tractor or other mobile vehicle in a manner so that the harvester may move vertically. Normally there is provided linkage at the bottom and at the top that permits the harvesting unit to be raised and lowered. Power for raising and lowering the harvester is normally created by a rockshaft that is connected to the upper linkage so that upon rocking the unit will be raised or lowered. The rockshaft is normally moved by a hydraulic power system on the tractor that includes an extensible and retractable hydraulic cylinder connected to the rockshaft.

Heretofore there have been automatic positioning means associated with the cotton harvester that included a linkage connection between the forward gathering shields of the harvester and a valve that moves material into the main hydraulic lift system of the harvester so that the harvesting unit is raised and/or lowered in accordance with the position of the gathering shield in relation to the ground. Such a structure is shown in U.S. Patent 2,972,847 that issued to C. Matthews, Jr., Feb. 28, 1961.

It is the primary object of the present invention to utilize the conventional type of lift system that is composed of the rockshaft and linkage to the harvesting units. It is further proposed to use a feeler mechanism that engages the ground and operates an independently controlled valve on the harvester that causes fluid to move into an auxiliary hydraulic cylinder that replaces one of the links that extends from the rockshaft to the upper portion of the harvester unit. By such a valve and hydraulic cylinder arrangement, the entire automatic or self-leveling system is completely independent of the main lift system for the harvester.

This is advantageous for the reason that it may be added as optional equipment to an otherwise conventional cotton harvester by utilizing the fittings for a remote cylinder that are conventional on tractors and other mobile vehicles to operate the hydraulic system in the self-positioning or self-leveling part of the device. Further, since the auxiliary or self-positioning cylinder is completely independent of the main cylinder that operates the lift system on the harvester, there is required only sufficient fluid to move the auxiliary cylinder. Since the self-positioning mechanism will operate only to raise or lower the harvester a few inches, the auxiliary cylinder may be of a relatively short stroke, thereby requiring only a small quantity of fluid to operate the cylinder. Consequently there will not be a large amount of fluid flowing in order to operate the auxiliary cylinder. This will reduce the friction through the valve system and consequently the heat buildup by movement of the fluid will be at a minimum.

Other objects and advantages of the present invention will become apparent to those skilled in the art as the nature of the invention is better understood from the following description and as shown in the accompanying drawings.

FIG. 1 is a front and side perspective view of a cotton harvester showing in part its supporting mechanism and also showing in a representative form the hydraulic system for raising and lowering the harvester.

FIG. 2 is a vertical sectional view through the valve that operates the self-positioning cylinder.

FIG. 3 is a view similar to FIG. 2 but showing the valve in a different position.

FIG. 4 is a view similar to FIGS. 2 and 3 but showing the valve in still a further position.

The harvesting unit 10 is representative of any of several presently on the market and is composed of a housing structure 11 that is supported on a tractor main frame, indicated only partially at 12, by a lower link 13 and upper linkage means, indicated in its entirety by the reference numeral 14. The harvesting unit and its supporting structure is representative of one that is shown and described in detail in U.S. Patent 2,719,394 which issued to Messrs. F. A. Thomann and R. H. Meier, Oct. 4, 1955. If more details of the mounting structure are desired, such may be had by reference to that patent.

The harvester 10 is raised and lowered on the lower link 13 by a basic rockshaft member 15 having a rock arm or lever 16 supported thereon midway between its ends. The rockshaft 15 is supported rigidly on or is a part of the tractor frame 12. The linkage 14 is composed of a pair of fore-and-aft extending links 17, 18 that are rigid with a transverse shaft 19, also supported on the frame 12, and an extensible and retractable link 20 that extends between the upper end of the lever 16 and a rock arm 21 fixed to the rockshaft 19. The extensible and retractable link 20 is composed of a cylinder 22 and a rod 23. The cylinder has a fluid inlet at one end that receives fluid through a fluid line 24. The hydraulic cylinder 22 and rod 23 are therefore a one-way cylinder that operates to raise the harvesting unit 10 and is effective to permit lowering of the unit 10.

Provided on the tractor and incorporated as a part thereof is a hydraulic system composed in part of a reservoir 30 and a pump 31 for moving fluid from the reservoir 30 to a valve 32. Extending from the valve 32 is a return line 33 to the reservoir 30 and a fluid line 34 to one end of a hydraulic power unit 35. The power unit 35 is connected to the lower end of the lever 16 by a link 36 and consequently by forcing fluid into the power unit 35 or withdrawing fluid therefrom the lever 16 is rocked and the entire harvesting unit 10 is raised or lowered.

Also connected to the pump 31 is a second hydraulic line 37 that extends to a fitting 38. A fluid return line 39 extends from the fitting 38 to the reservoir 30. The fitting 38 is one that is conventional on most tractors and serves to operate a remote or attachment cylinder that may be utilized in various manners for operation of different implements and attachments. Coupled to the fitting 38 are upper and lower fluid lines 40, 41 that are in communication with the feed line 37 and return line 39 respectively. The upper line 40 is joined and is in communication with the line 24 leading to the cylinder 22. Downstream from the line or passage 24 is a restrictor valve 42. The restrictor valve 42 is composed of an outer cylindrical shell 43 with a fluid inlet 44 connected to the line 40 and a fluid discharge 45 coupled to the return line 41. Supported within the casing 43 is a core 46 having a diametrical passage 47. As may best be seen from viewing FIGS. 2, 3 and 4, the inlet 44 and outlet 45 are diametrically opposite to one another and consequently the passage 47 may be moved in and out of registry with the inlet and outlet. The core 46 is supported within the casing 43 for rocking motion and such rocking motion is effected by a lever arm 48 that is fixed to one end of the core.

Pivotally supported on a transverse pivot pin 50 on the forward end of the housing structure 11 is a ground feeler or shoe 51 that extends downwardly and rearwardly beneath the lower side of the housing structure. Normally the shoe 51 gravitates into contact with the surface of the ground. Projecting upwardly from the upper side of the shoe or feeler 51 is a link 54 that has its upper end connected to the lever arm 48. Consequently movement of the shoe 51 effects movement vertically of the arm 48.

The invention operates in the following manner. Normally the housing structure 11 is raised and lowered through expansion and/or retraction of the hydraulic power unit 35. The extensible and retractable link 20 does not have any effect upon the basic positioning of the unit 10. Its fundamental and only purpose is to retain the desired height of the harvesting unit 10 in relation to the ground. Consequently the valve 32 determines the general position of the unit 10. However, as the unit is in operation the pump 31 will normally cause fluid to move into the passages 37, 40 under pressure. If the valve core 46 is in a position as shown in FIG. 3, the fluid is blocked from moving into the return lines 41, 39 and will move into the passage 24 and the end of the cylinder 22. This will cause the cylinder to retract which will in effect raise the hydraulic unit 10. If the passage 47 is in registry with the lines 40, 41 fluid will move out of the cylinder 22 and return through the lines 41, 39 to the reservoir 30. The weight of the harvesting unit 10 will then cause the rod 23 to move outwardly of the cylinder 22 and the unit 10 will lower. Reviewing FIG. 1, if the unit 10 passes over a relatively low surface of ground, the shoe 51 will drop causing the lever 48 to drop into the position shown in FIGS. 1 and 2. This will cause the unit 10 to drop which will then force the shoe 51 vertically to move the lever 48 either into a position shown in FIG. 3 in which the fluid is blocked or into a position shown in FIG. 4 in which the fluid is only partially restricted. Normally the operating zone is in a position shown somewhat in FIG. 4. The operating zone is such that the passage 47 is slightly in registry with the inlet 44 and outlet 45. Should the level of the ground become low for a short distance, the shoe 51 and lever arm 48 will drop to permit more fluid to pass to the reservoir 30 through the outlet lines 41, 39. Thus the harvesting unit 10 will drop to a desired height above the low ground. Should the harvester 10 move over high ground a short distance, the ground will contact and push upwardly the shoe 51 and lever arm 48 from the normal operating zone shown in FIG. 4 to a zone more nearly to that shown in FIG. 3 in which the fluid is blocked. This will cause fluid to move into the cylinder 22 and cause the rod 23 to retract. This raises the entire unit 10 until the shoe 51 and lever arm 48 are lowered into a position of the operating zone as shown in FIG. 4. Consequently the harvesting unit will move at a predetermined height above the ground and the feeler 51 will actually actuate the cylinder 22 and rod 23 to maintain that desired height above the ground.

What is claimed is:

1. In a cotton harvester having a housing structure supported on a frame for vertical movement, the improvement comprising: horizontal rockshaft means; link means between the rockshaft means and housing structure for raising and lowering the harvester upon rocking of the rockshaft means; a fluid source; pump means for moving the fluid from the source; a hydraulic power unit for rocking the rockshaft means; a fluid connection between the pump and power unit including a control valve; a fluid conduit system extending from the pump and having a return to the fluid source; an extendible and retractable hydraulic link in the aforesaid link means adapted to vertically adjust the harvester independently of the hydraulic power unit; a fluid passage extending between the hydraulic link and the conduit system; a restrictor valve in the conduit system downstream from the passage and supported on the harvester housing structure; a ground-engaging member supported on the housing structure for vertical movement and adapted to shift vertically relative to the housing structure in accordance with the relative vertical spacing between the structure and the ground level; and a connection between the restrictor valve and member for affecting the effective restriction in the valve to thereby adjust in accordance therewith the length of the hydraulic link.

2. In a cotton harvester having a housing structure supported on a frame for vertical movement, the improvement comprising: a power operated rockshaft means; link means between the rockshaft means and housing structure for raising and lowering the housing structure upon rocking of the rockshaft means; a fluid source; an extendible and retractable hydraulic link in the aforesaid link means adapted to vertically adjust the housing structure independently of the rockshaft means; a pressurized fluid passage means for operating the hydraulic link; a valve in the passage means supported on the housing structure; a ground-engaging member supported on the housing structure for vertical movement and adapted to shift vertically relative to the housing structure in accordance with the relative vertical spacing between the structure and the ground level; and a connection between the valve and member for adjusting the length of the hydraulic link.

3. The structure as set forth in claim 2 in which the hydraulic link is a single-acting ram and cylinder, the passage means is a single passage with an outlet to one end of the ram and cylinder, and the valve is in the passage to effect movement of the fluid to and from the cylinder.

4. The structure as set forth in claim 3 in which the valve is a restrictor valve downstream of the ram and cylinder and when closed, forces fluid into the cylinder.

5. The structure as set forth in claim 4 in which the valve has a valve housing with a fluid inlet and outlet in communication with the passage and a movable valve core having a passage therein adapted to effect communication between the inlet and outlet and to block communication between the inlet and outlet, and the connection between the ground-engaging member and valve effects movement of the valve core into and out of communication with the inlet and outlet.

References Cited

UNITED STATES PATENTS

| 2,700,857 | 2/1955 | Stearmax | 56—208 X |
| 2,719,394 | 10/1955 | Thomann et al. | 56—14 |
| 2,972,847 | 2/1961 | Matthews | 56—11 |

ABRAHAM G. STONE, *Primary Examiner.*

PASQUALE A. RAZZANO, *Assistant Examiner.*

U.S. Cl. X.R.

56—208